United States Patent Office 3,574,630
Patented Apr. 13, 1971

3,574,630
STABILIZATION OF AQUEOUS SOLUTIONS OF CERTAIN DYES
Donald W. Heseltine and Frank G. Webster, Rochester, N.Y., assignors to Eastman Kodak Company, Rochester, N.Y.
No Drawing. Continuation-in-part of application Ser. No. 521,529, Jan. 19, 1966. This application June 4, 1969, Ser. No. 830,482
Int. Cl. G03c 1/08, 1/10
U.S. Cl. 96—130
10 Claims

ABSTRACT OF THE DISCLOSURE

Photographic silver halide emulsions are spectrally sensitized with stable, aqueous solutions of acid substituted photographic spectral sensitizing dyes having a pH of about 6 to 7.5.

---

This application is a continuation-in-part of our co-pending U.S. application Ser. No. 521,529 filed Jan. 19, 1966, and now abandoned.

This invention relates to novel photographic materials, and to processes for preparing photosensitive compositions.

One aspect of the invention relates to improved processes for spectrally sensitizing photographic emulsions. The invention also relates to novel solutions of spectral sensitizing dyes.

It is especially desirable to spectrally sensitize photosensitive materials dispersed in a hydrophilic colloid with aqueous solutions of spectral sensitizing dyes. Aqueous dye solutions may be added to hydrophilic colloid systems conveniently, thereby avoiding the problems encountered when organic solvent solutions of dyes are employed. One of the principal disadvantages of using organic solvent solutions of sensitizing dyes is that coating defects frequently occur when the hydrophilic colloid system is coated on a support.

One of the problems with aqueous solutions of water-soluble acid substituted dyes has been the tendency of the dye to lose density rapidly during storage. This characteristic is quite objectionable in manufacturing operations where it is desirable to prepare the dye solution considerably before it is incorporated in the photosensitive material. We have now found a method for increasing the stability of aqueous solutions of acid substituted dyes against loss of density during storage.

One object of this invention is to provide novel aqueous solutions of spectral sensitizing dyes which are stabilized against loss of density during storage. Another object of this invention is to provide a novel process for spectrally sensitizing photosensitive materials dispersed in a hydrophilic colloid with stabilized solutions of spectral sensitizing dyes. Still another object of this invention is to provide novel aqueous solutions of acid substituted spectral sensitizing dyes which do not decompose even when exposed to light for considerable periods of time. Other objects of this invention will be apparent from the following disclosure and appended claims.

In one embodiment of this invention, we provide novel aqueous solutions of acid substituted spectral sensitizing dyes having a pH between 6 to 7.5. We have found that such solutions of spectral sensitizing dyes exhibit excellent stability against loss of density during storage.

In another embodiment of this invention, aqueous solutions of acid substituted spectral sensitizing dyes maintained at a pH of about 6 to 7.5, are added to photosensitive materials, such as silver halide, dispersed in a hydrophilic colloid.

Any suitable base may be employed to adjust the pH of the dye solutions in accordance with the invention. Preferably, weak organic bases are used, such as pyridine, isoquinoline, quinoline, and 2,6-dimethylpyridine. Especially good results are obtained with nitrogen-containing weak organic bases. Stronger bases, such as inorganic bases (e.g. NaOH) can be employed although it is sometimes more difficult to achieve the proper pH therewith. Preferably, the pH of the solution is adjusted soon after the dye is dissolved. It is, of course, desirable to adjust the pH prior to any substantial loss of dye density. Pyridine is preferred and is especially useful in amounts of about $10^{-3}$ or $10^{-2}$ up to about $10^{-1}$ moles.

In the preferred embodiments of the invention, water is the sole solvent. However, minor proportions (e.g. up to about 45%) of organic solvents may be used if desired. With some dyes it is necessary to use minor portions of organic solvent, such as an alcohol, e.g., methanol, ethanol or proponal, or other organic solvents such as acetone.

The invention is especially useful with the acid substituted spectral sensitizing dyes, such as the acid substituted cyanine or merocyanine dyes. Preferably, to impart greater water solubility, the dyes are diacid substituted. Typical acid substituents are sulfato ($—SO_4—$), sulfo ($—SO_3—$) and carboxy groups, such as the sulfoalkyl and carboxyalkyl groups wherein the alkyl substituent has from 1 to 4 carbon atoms. Typical useful dyes are all those disclosed in U.S. Pats. 2,503,776; 2,526,632; and 3,148,187. The invention is particularly useful with the diacid substituted oxacarbocyanine dyes, which exhibit a pronounced tendency to decompose rapidly in aqueous solutions. Oxacarbocyanine dyes have particularly good stability to light. Therefore, solutions of oxacarbocyanine dyes in accordance with the invention can be stored under normal room light conditions for long periods of time.

Especially useful dyes herein include the nuclear sulfo-substituted cyanine dyes represented by the formula:

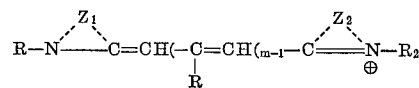

in which R and $R_2$ each represents a lower alkyl group such as methyl, ethyl, propyl, isopropyl, butyl, secondary butyl, tertiary butyl, etc., a sulfoalkyl group in which the alkyl group has from 1 to 4 carbon atoms, such as sulfomethyl, sulfoethyl, sulfopropyl, sulfobutyl, etc., and a carboxyalkylgroup in which the alkyl group has from 1 to 4 carbon atoms such as carboxymethyl, carboxyethyl, carboxypropyl, carboxybutyl, etc.; $R_1$ represents a hydrogen atom or a lower alkyl group such as methyl, ethyl, propyl, butyl, etc.; $Z_1$ and $Z_2$ each represents the nonmetallic atoms necessary to complete a heterocyclic nucleus of the benzothiazole series (e.g., benzothiazole, 4-chlorobenzothiazole, 5-chlorobenzothiazole, 7-chlorobenzothiazole, 4-methylbenzothiazole, 5-methylbenzothiazole, 5-bromobenzothiazole, 4-phenylbenzothiazole, 5-phenylbenzothiazole, 6-phenylbenzothiazole, 4-methoxybenzothiazole, 5-methoxybenzothiazole, 5-iodobenzothiazole, 4-ethoxybenzothiazole, 5-ethoxybenzothiazole, 5-hydroxybenzothiazole, etc.); those of the naphthothiazole series (e.g., α-naphthothiazole, β-naphthothiazole, 5-methoxy-β-naphthothiazole, 5-ethyl-β-naphthothiazole, 8-methoxy-α-naphthothiazole, 7-methoxy-α-naphthothiazole, etc.); those of the benzoxazole series (e.g., benzoxazole, 5-chlorobenzoxazole, 5-methylbenzoxazole, 5-phenylbenzoxazole, 5-methoxybenzoxazole, 5 - ethoxybenzoxazole, 5 - hydroxybenzoxazole, etc.); those of the naphthoxazole series (e.g., α-naphthoxazole, β-naphthoxazole, etc.); those of the benzoselenazole series (e.g., benzoselenazole, 5-chlorobenzoselenazole, 5-methylbenzoselenazole, 5-hydroxybenzoselenazole, etc.); those of the naphthoselenazole series (e.g., α-naphthoselenazole, β-naphthoselenazole, etc.); those of the quinoline series including the 2-quinolines (e.g., quinoline, 3 - methylquinoline, 5 - methylquinoline, 7-methylquinoline, 8-methylquinoline, 6-chloroquinoline, 8-chloroquinoline, 6-methoxyquinoline, 6-hydroxyquinoline, 8-hydroxyquinoline, etc.); the 4-quinolines (e.g., quinoline, 6-methoxyquinoline, 7-methoxyquinoline, 8-methoxyquinoline, etc.); those of the isoquinoline series (e.g., the 1-isoquinoline series (e.g., the 1-isoquinolines, the 3-isoquinolines, etc.); at least one of the groups $Z_1$ and $Z_2$ having a sulfo-substituent; and $m$ is the integer 1, 2 or 3.

Another useful class of dyes in this invention includes those having the formula:

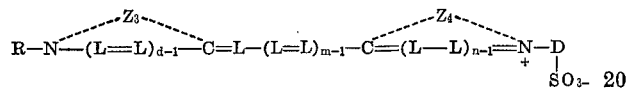

wherein R has the meaning given above; $d$ and $n$ each represents an integer of from 1 to 2; $m$ represents an integer of from 1 to 3; L represents a methine group (e.g., —CH=, —C(CH$_3$)=, etc.); D represents a divalent hydrocarbon radical, e.g., alkylene group such as methylene, ethylene,

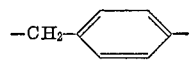

trimethylene, etc.; and $Z_3$ and $Z_4$ each is selected from a value given for $Z_1$ and $Z_2$, but neither $Z_3$ nor $Z_4$ is necessarily sulfo-substituted.

The invention may also be practiced with dyes having the following general formula:

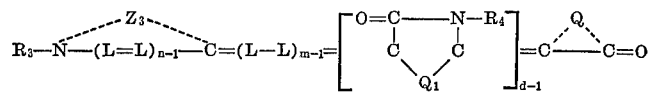

wherein $R_3$ and $R_4$ each represents an alkyl group (substituted or unsubstituted), e.g. methyl, ethyl, n-butyl, isobutyl, allyl, β-ethoxyethyl, β-hydroxyethyl, β-acetoxyethyl, carbethoxymethyl, benzyl, β-phenylethyl, etc. (e.g. an alkyl group, especially a primary alkyl group, containing from 1 to 8 carbon atoms), or an aryl group, e.g. a monocyclic aryl group of the benzene series, such as phenyl, p-chlorophenyl, etc., L represents a methine group (substituted or unsubstituted), $n$ and $d$ each represents a positive integer of from 1 to 2, $m$ represents a positive integer of from 1 to 3, $Q_1$ represents an oxygen atom, a sulfur atom, or a group of the formula

wherein $R_5$ represents an alkyl group (substituted or unsubstituted), e.g. methyl, ethyl, n-butyl, isobutyl, allyl, β-ethoxyethyl, β-hydroxyethyl, β-acetoxyethyl, carbethoxymethyl, benzyl, β-phenylethyl, etc. (e.g. an alkyl group, especially a primary alkyl group, containing from 1 to 8 carbon atoms), or an aryl group, e.g. a monocyclic aryl group of the benzene series, such as phenyl, p-chlorophenyl, etc., Q represents the non-metallic atoms necessary to complete a heterocyclic nucleus containing 5 atoms in the ring, e.g. a rhodanine nucleus, a 2-thio-2,4(3,5)-oxazoledione nucleus, a 5-pyrazolone nucleus, a 2-thiohydantoin nucleus, etc., said heterocyclic nucleus containing at least one group selected from the group consisting of a monocyclic carboxyaryl group of the benzene series (e.g. a p-carboxyphenyl group, a 3-carboxy-4-hydroxy-phenyl group, etc.) a carboxyaryl group of the naphthalene series (e.g. a 4-carboxy-1-naphthyl group, etc.), a monocyclic sulfoaryl group of the benzene series (e.g. a p-sulfophenyl group, a 2,5-disulfophenyl group, etc.), and a sulfoaryl group of the naphthalene series (e.g. a 4-sulfo-1-naphthyl group, etc.), and alkali metal (e.g. sodium, potassium, lithium, etc.) and ammonium salt forms of these groups, and $Z_3$ has the meaning given above.

The effective concentrations of dye required to spectrally sensitize photosensitive materials are the same as with prior art dye solutions. For example, in sensitizing silver halide, the most useful concentration of dye is from about 5 to about 100 mg per liter of flowable silver halide emulsion. The operable concentration may vary over a wide range, if desired.

The most useful dyes have a solubility in water at the rate of at least .001 part in 5 parts aqueous solution. As used herein, aqueous solution includes solutions where water is the sole solvent as well as aqueous solutions containing minor portions of organic solvent as described above.

The following examples are included for a further understanding of the invention.

Example 1 illustrates the excellent stability of dye solutions of the invention.

EXAMPLE 1

Dye I, anhydro-5,5'-dichloro - 9 - ethyl-3,3'-di(3-sulfopropyl)oxacarbocyanine hydroxide, sodium salt is dissolved at 0.3 g./100 ml. solution in 0.01 M and 0.001 M aqueous pyridine at room temperature using an ultrasonic generator, and stored in a glass-stoppered flask in the dark at about 36° F. for 17 days. Dye density and pH measurements after that time show essentially no difference from those of the freshly prepared solutions, as shown below.

| Solution | pH | | Density at 493 mμ | |
|---|---|---|---|---|
| | Fresh | 17 days | Fresh | 17 days |
| 0.01 M aqueous pyridine plus Dye I | 7.2 | 7.0 | 1.16 | 1.16 |
| Do | 6.4 | 6.25 | 1.16 | 1.15 |

A sample of the dye solution which had been stored at 36° F. for 17 days was placed in a clear glass container and exposed to normal laboratory lighting at room temperature for an additional 60 days. There was no measurable decomposition of the dye at the end of this period. This is highly unexpected since most cyanine dyes decompose rapidly on exposure to light. Similar results to those in Example 1 are obtained when the dye is dissolved by heating (at about 60° C.) rather than using ultrasonics to dissolve the dye.

Example 2 illustrates the excellent sensitizing properties of dye solutions of the invention.

EXAMPLE 2

A green-sensitive layer of the type described in U.S. Patent 3,046,129, spectrally sensitized with Dye I at 100 mg. per mole silver from the following solutions is coated on a cellulose acetate film support at 350 mg. silver per square foot and 810 mg. gelatin per square foot. The dried coatings are exposed and developed for 5 minutes in Kodak DK–50 Developer and fixed, washed and dried with the following results.

| Dye I solution | Relative speed | Fog |
|---|---|---|
| 5 mg./6 cc. MeOH | 100 | .04 |
| 5 mg./3 cc. MeOH | 95 | .04 |
| 3 mg./1 cc. .001 M aqueous pyridine | 91 | .04 |

EXAMPLES 3–12

Aqueous solutions of various spectral sensitizing dyes are prepared as described in Example 1.

Example 3—Anhydro-5'-chloro-9-ethyl-3-methyl-3'-(3-sulfobutyl)-4,5-benzothiacarbocyanine hydroxide, monosulfonated.

Example 4—Anhydro-3,3'9-triethyl-5,5'-di(p-sulfophenyl)oxacarbocyanine hydroxide.

Example 5—Anhydro-1,1'-diethyl-2,2'-cyanine hydroxide, monosulfonated.

Example 6—4-[4-(3-ethyl-2(3H)-benzoxazolylidene)-2-butenylidene]-3-methyl-1-p-sulfophenyl-2-pyrazolin-5-one, monosulfonated.

Example 7—4-(3-ethyl-2(3H)-benzothiazolylidene)-3-methyl-1-(p-sulfophenyl)-2-pyrazolin-5-one.

Example 8—3-(p-carboxyphenyl)-5-(3-methyl-2(3H)-benzoxazolylidene)-rhodanine.

Example 9—5-[(3-ethyl-2(3H)-benzoxazolylidene)ethylidene]-3-(p-sulfophenyl)2-thio-2,4(3,5)-oxazoledione.

Example 10—Anhydro-3-β-carboxyethyl-5,5'-dichloro-9-methyl-3'-β-sulfoethylthiacarbocyanine hydroxide.

Example 11—Anhydro-5,5'-dichloro-9-ethyl-3,3'-di-β-sulfoethylthiacarbocyanine hydroxide.

Example 12—Anhydro-5,5'-dichloro-3,3'-di-p-sulfobenzylthiacarbocyanine hydroxide.

In Examples 7–9, the aqueous solutions contain minor proportions of ethanol to provide a sufficiently high concentration of the sensitizing dye in the solution. The solutions obtained in Examples 3–12 all exhibit greatly increased stability to loss of density during storage when compared to control solutions which do not have the pH regulated in accordance with this invention. Each of the dyes of these examples, when used to sensitize emulsions as described in Example 2, provide excellent spectral sensitization. The spectral sensitization is essentially the same as that obtained when control solutions of the dyes, which are not regulated to a pH in accordance with the invention, are used to sensitize the emulsion.

The necessity for controlling the pH of the aqueous dye solutions in accordance with the invention is illustrated by Examples 13 and 14.

EXAMPLE 13

Dye I is dissolved at 0.3 g. per 100 ml. solution in distilled water, distilled water with 2 ml. acetic acid, distilled water with 2 ml. triethylamine, and distilled water with 1 ml. acetic acid and 1 ml. triethylamine. The dyes are dissolved at room temperature using an ultrasonic generator. The solutions are stored in a glass-stoppered flask in the dark at about 36° F., with densities taken at various times as shown below.

| Aqueous Solutions of Dye I | pH | Densities at 493 mµ | | |
|---|---|---|---|---|
| | | Fresh | 1–3 days | 5–21 days |
| Control (water only) | 5.87 | 1.16 | .94 | .36 |
| Water and 2 ml. acetic acid | 2.9 | .73 | 0 | |
| Water and 2 ml. triethylamine | 11.6 | .94 | .69 | .05 |
| Water and 1 ml. acetic acid and 1 ml. triethylamine | 4.5 | 1.12 | .96 | .16 |

It may be seen that solutions of dyes which have a pH outside the range of the invention have poor stability.

EXAMPLE 14

Dye I, anhydro-5,5'-dichloro-9-ethyl-3,3' - di(3-sulfopropyl)oxacarbocyanine hydroxide, triethylamine salt, is dissolved by heating the dye in aqueous solutions containing various amounts of pyridine. Each solution contains 3 grams of dye per 100 ml. of solvent. Solution 1 contains no pyridine; Solution 2 contains .08 ml. ($10^{-2}$ molar) pyridine; and, Solution 3 contains .8 ml. ($10^{-1}$ molar pyridine; and, Solution 4 contains 8.1 ml. (1 molar) pyridine. The optical density of these solutions is determined when the solutions are prepared and at various periods thereafter. During storage, the solutions are kept in the dark and at room temperature. The optical density is measured at a wavelength of 490 mm. using a 1/20,000 aqueous dilution of the solutions. A loss of more than about 5% (.07 with the instant dye solutions) in optical density renders dye solution unsuitable for high quality spectral sensitization of photographic silver halide. The optical density measurements were made using a cuvette 2 mm in thickness. The results are set out below:

TABLE 1

| Time | Solution 1 No pyridine | | Solution 2 $10^{-2}$ molar pyridine | | Solution 3 $10^{-1}$ molar pyridine | | Solution 4 1 molar pyridine | |
|---|---|---|---|---|---|---|---|---|
| | Optical density | pH | Optical density | pH | Optical density | pH | Optical density | pH |
| Freshly prepared | 1.5 | 3.26 | 1.57 | 6.72 | 1.57 | 7.68 | 1.58 | 8.49 |
| 1 hr | 1.37 | 3.21 | 1.56 | 6.78 | 1.57 | 7.69 | 1.57 | 8.45 |
| 5 hr | .91 | 2.72 | 1.56 | 6.83 | 1.60 | 7.63 | 1.60 | 8.29 |
| 1 day | 0 | 2.51 | 1.56 | 6.74 | 1.56 | 7.50 | 1.57 | 8.18 |
| 3 days | | | 1.54 | 6.73 | 1.56 | 7.46 | 1.48 | 8.08 |
| 7 days | | | 1.54 | 6.63 | 1.54 | 7.46 | 1.41 | 8.08 |
| 14 days | | | 1.54 | 6.64 | 1.50 | 7.39 | 1.23 | 8.01 |

The above table shows that aqueous solutions of acid substituted dyes (Solutions 1 and 4) which are not maintained in the pH range utilized in this invention do not have good stability on storage. Solutions 1 and 4 are not satisfactory for spectrally sensitizing photographic emulsions after the two week storage period. However, Solutions 2 and 3, which are maintained in the required pH range during storage, exhibit little loss in optical density and are completely satisfactory for spectrally sensitizing silver halide emulsions after the storage. Solution 4 in the above table contains about 8% by weight pyridine. Higher concentrations, such as solutions of dye in a 50–50 water-pyridine mixture, are completely unsatisfactory due to a rapid drop in optical density on storage. Mixtures of certain organic solvents, such as a 50–50 pyridine-acetone mixture (suggested in U.S. Pat. 3,354,170, col. 8, line 24) are not even solvents for most acid substituted dyes of the type described herein. Sprague in U.S. Pat. 2,503,776, col. 14, line 17, suggests forming salts of acid substituted dyes by adding pyridine to the cyanine hydroxide, and then taking up the salt which forms with water. However, addition of the amount of pyridine required to form the dye salt would not be sufficient to raise the pH of the water required to dissolve the dye to a sufficiently high level to obtain stable dye solutions in accordance with the practice of this invention.

The aqueous solutions of sensitizing dyes in accordance with the invention may be prepared by dissolving the dye in the aqueous solution at elevated temperatures or, by subjecting the mixture of dye and aqueous solution to ultrasonic agitation. The latter process allows relatively low temperature dissolving of the dye, thereby avoiding danger of damaging the sensitizing qualities of the dye.

The highly stable aqueous dye solutions of this invention may be employed to spectrally sensitize a wide variety of photographic materials including zinc oxide, titanium dioxide, organic photoconductors and silver halide, such as silver chloride, silver bromide and mixed halides such as silver bromoiodide and silver chlorobromide.

Photosensitive materials may be spectrally sensitized with the solutions of this invention in any convenient manner, such as by forming a liquid dispersion of the photosensitive material in a hydrophilic colloid, and adding a dye solution of the invention thereto. Dried coatings of photosensitive material, including binderless deposits of silver halide may be sensitized by bathing the coating in dye solutions of the invention. Effective dye concentrations depend on the particular dye and photosensitive material. For silver halide most dyes provide good results at concentrations of about 5 to 100 mg. dye per liter of flowable emulsion.

The solutions of the invention are especially useful in spectrally sensitizing photographic silver halide emulsions. These emulsions may contain the usual addenda such as the chemical sensitizers, stabilizers, speed increasing agents, plasticizers and hardeners, and coating aids referred to in U.S. Pat. 3,039,873, columns 10–12. The silver halide or other radiation sensitive material may be dispersed in any suitable medium preferably a hydrophilic colloid such as those referred to in column 13 of U.S. Pat. 3,039,873. The photosensitive emulsions or materials spectrally sensitized in accordance with the invention may be coated on any suitable support, such as film base, e.g., cellulose acetate or polyethylene terephthalate, or other supports such as paper, including polyolefin (e.g., polyethylene or polypropylene) coated paper.

Although the invention has been described in considerable detail with particular reference to certain preferred embodiment thereof, it will be understood that variations and modifications can be effected within the spirit and scope of the invention as described hereinabove, and as defined in the appended claims.

We claim:

1. The process of spectrally sensitizing a light sensitive photographic silver halide emulsion which comprises dissolving an acid substituted cyanine or merocyanine photographic spectral sensitizing dye in aqueous solution; maintaining the pH of the solution at about 6 to 7.5; and, incorporating said solution in a light sensitive photographic silver halide emulsion to spectrally sensitize the silver halide.

2. The process of claim 1 wherein said dye is a diacid substituted dye having a solubility in aqueous solutions of at least .001 part dye per 20 parts aqueous solution.

3. The process of claim 1 wherein said dye is an oxacarbocyanine dye and the acid groups are selected from the class consisting of sulfo, carboxy and sulfato groups.

4. The process of claim 1 wherein said solution of photographic spectral sensitizing dye in aqueous solution is stored, after the pH thereof has been adjusted to about 6 to 7.5, prior to incorporation in the silver halide emulsion.

5. The process of spectrally sensitizing light sensitive photographic silver halide emulsions which comprises dissolving an acid substituted photographic spectral sensitizing dye in aqueous solution; maintaining the pH of the solution at about 6 to 7.5; and, incorporating said solution in a light sensitive photographic silver halide emulsion to spectrally sensitize the silver halide, said spectral sensitizing dye having at least one of the following structural formulas:

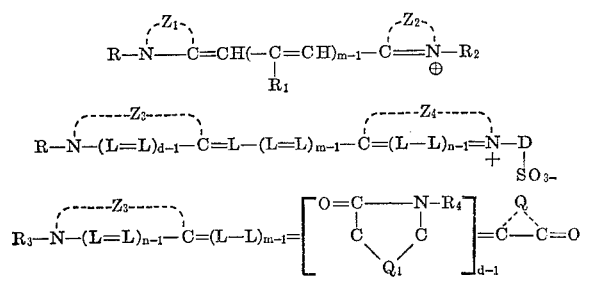

wherein R and $R_2$ each represents an alkyl group containing from 1 to 4 carbon atoms; $R_1$ represents a hydrogen atom or an alkyl group containing from 1 to 4 carbon atoms; $R_3$ and $R_4$ each represents an alkyl group containing from 1 to 8 carbon atoms or an aryl group; $Z_1$, $Z_2$, $Z_3$ and $Z_4$ each represents the non-metallic atoms necessary to complete a heterocyclim nucleus selected from the group consisting of a benzothiazole nucleus, a napthothiazole nucleus, a benzoxazole nucleus, a napthoxazole nucleus, a benzoselenazole nucleus, a napthoselenazole nucleus and a quinoline nucleus, at least one of the groups $Z_1$ and $Z_2$ having a sulfo substituent; $m$ represents a positive integer of from 1 to 3; $n$ and $d$ each represents an integer of from 1 to 2; L represents a methine group; D represents a divalent hydrocarbon radical; $Q_1$ represents a member selected from the group consisting of an oxygen atom, a sulfur atom and a group having the formula:

wherein $R_5$ represents an alkyl group containing from 1 to 8 carbon atoms or an aryl group; Q represents the non-metallic atoms necessary to complete a heterocyclic nucleus containing 5 atoms in the ring, said heterocyclic nucleus containing at least one group selected from a monocyclic carboxyaryl group of the benzene or napthalene series and a monocyclic sulfoaryl group of the benzene or napthalene series, and alkali metal and ammonium salts of these groups.

6. The process of spectrally sensitizing light sensitive photographic silver halide emulsions which comprises dissolving an acid substituted photographic spectral sensitizing dye in aqueous solution; maintaining the pH of the solution at about 6 to 7.5; and, incorporating said solution in a light sensitive photographic silver halide emulsion to spectrally sensitize the silver halide, said spectral sensitizing dye having the following formula:

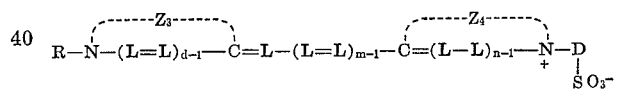

wherein R represents an alkyl group containing from 1 to 4 carbon atoms; $d$ and $n$ each represents an integer of from 1 to 2; $m$ represents an integer of from 1 to 3; $Z_3$ and $Z_4$ each represents the non-metallic atoms necessary to complete a heterocyclic nucleus selected from the group consisting of a benzothiazole nucleus, a naphthothiazole nucleus, a benzoxazole nucleus, a napthoxazole nucleus, a benzoselenazole nucleus, a napthoselenazole nucleus and a quinoline nucleus; L represents a methine group; and, D represents an alkylene group.

7. The process of spectrally sensitizing light sensitive photographic silver halide emulsions which comprises dissolving an acid substituted photographic spectral sensitizing dye in aqueous solution; maintaining the pH of the solution at about 6 to 7.5; and, incorporating said solution in a light sensitive photographic silver halide emulsion to spectrally sensitize the silver halide, wherein said dye is a diacid substituted oxacarbocyanine dye, said acid groups being selected from sulfoalkyl and carboxyalkyl groups wherein the alkyl substituent contains from 1 to 4 carbon atoms.

8. The process of spectrally sensitizing light sensitive photographic silver halide emulsions which comprises dissolving an acid substituted photographic spectral sensitizing dye in aqueous solution; maintaining the pH of the solution at about 6 to 7.5 with pyridine; and, incorporating said solution in a light sensitive photographic silver halide emulsion to spectrally sensitize the silver halide, said spectral sensitizing dye having the following formula:

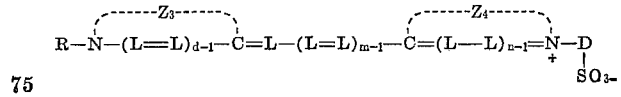

wherein R represents an alkyl group containing from 1 to 4 carbon atoms; $d$ and $n$ each represents an integer of from 1 to 2; $m$ represents an integer of from 1 to 3; $Z_3$ and $Z_4$ each represents the non-metallic atoms necessary to complete a heterocyclic nucleus selected from the group consisting of a benzothiazole nucleus, a napthothiazole nucleus, a benzoxazole nucleus, a napthoxazole nucleus, a benzoselenazole nucleus, a napthoselenazole nucleus and a quinoline nucleus; L represents a methine group; and, D represents an alkylene group.

9. The process of spectrally sensitizing light sensitive photographic silver halide emulsions which comprises dissolving an acid substituted photographic spectral sensitizing dye in aqueous solution; maintaining the pH of the solution at about 6 to 7.5 with pyridine; and, incorporating said solution in a light sensitive photographic silver halide emulsion to spectrally sensitize the silver halide, wherein said dye is a diacid substituted oxacarbocyanine dye, said acid groups being selected from sulfoalkyl and carboxyalkyl groups wherein the alkyl substituent contains from 1 to 4 carbon atoms.

10. The process of spectrally sensitizing a light sensitive photographic silver halide emulsion which comprises dissolving anhydro - 5,5' - dichloro-9-ethyl-3,3'-di(3-sulfopropyl)oxacarbocyanine hydroxide in an aqueous solution, said solution containing from about $10^{-2}$ to $10^{-3}$ moles of pyridine; and, incorporating said solution in a light sensitive photographic silver halide emulsion to spectrally sensitize the silver halide.

References Cited

UNITED STATES PATENTS

| | | | |
|---|---|---|---|
| 2,503,776 | 4/1950 | Sprague | 96—106 |
| 2,519,001 | 8/1950 | Sprague | 96—102 |
| 2,526,632 | 10/1950 | Brooker et al. | 96—102 |
| 2,759,822 | 9/1956 | Jones et al. | 96—102 |
| 2,640,776 | 6/1953 | Spence et al. | 96—102 |
| 3,038,800 | 6/1962 | Luckey et al. | 96—102 |
| 3,395,017 | 7/1968 | Knott | 96—102 |
| 3,354,170 | 11/1967 | Rosenoff | 96—106 |

NORMAN G. TORCHIN, Primary Examiner

E. C. KIMLIN, Assistant Examiner

U.S. Cl. X.R.

96—106